(12) United States Patent
Baun

(10) Patent No.: US 10,934,999 B2
(45) Date of Patent: Mar. 2, 2021

(54) METHODS FOR MOUNTING OR DISMOUNTING WIND TURBINE COMPONENTS OF A MULTIROTOR WIND TURBINE

(71) Applicant: Vestas Wind Systems A/S, Aarhus N. (DK)

(72) Inventor: Torben Ladegaard Baun, Skødstrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 258 days.

(21) Appl. No.: 16/061,169

(22) PCT Filed: Dec. 15, 2016

(86) PCT No.: PCT/DK2016/050434
§ 371 (c)(1),
(2) Date: Jun. 11, 2018

(87) PCT Pub. No.: WO2017/108049
PCT Pub. Date: Jun. 29, 2017

(65) Prior Publication Data
US 2020/0263668 A1     Aug. 20, 2020

(30) Foreign Application Priority Data
Dec. 22, 2015 (DK) .......................... PA 2015 70858

(51) Int. Cl.
*F03D 13/10*    (2016.01)
*F03D 1/02*    (2006.01)

(52) U.S. Cl.
CPC ............... *F03D 13/10* (2016.05); *F03D 1/02* (2013.01)

(58) Field of Classification Search
CPC .................................. F03D 13/10; F03D 1/02
See application file for complete search history.

(56) References Cited

U.S. PATENT DOCUMENTS

2006/0147308 A1    7/2006    Wobben

FOREIGN PATENT DOCUMENTS

| CN | 101446270 A | 6/2009 |
| CN | 201250765 Y | 6/2009 |

(Continued)

OTHER PUBLICATIONS

European Patent Office, International Search Report and Written Opinion in PCT Serial No. PCT/DK2016/050434, dated Mar. 8, 2017.

(Continued)

*Primary Examiner* — Moshe Wilensky
(74) *Attorney, Agent, or Firm* — Wood Herron & Evans LLP

(57) ABSTRACT

A method for mounting or dismounting a wind turbine component of an energy generating unit in a multirotor wind turbine is disclosed. The multirotor wind turbine comprises a tower configured to support one or more load carrying structures each arranged for supporting at least two energy generating units arranged at or near its ends and at opposite sides of the tower. The method comprises positioning or dispositioning a first wind turbine component at a first end of the load carrying structure, yawing the load carrying structure approximately 180 degrees, and positioning or dispositioning a second wind turbine component at the second end of the load carrying structure opposite the first end. The method may be used in erecting or servicing a multirotor wind turbine.

16 Claims, 6 Drawing Sheets

(56) References Cited

FOREIGN PATENT DOCUMENTS

| | | |
|---|---|---|
| DE | 830180 C | 1/1952 |
| DE | 4432800 A1 | 3/1996 |
| DE | 102012020052 B3 | 4/2014 |
| GB | 2402109 A | 12/2004 |
| GB | 2443886 A | 5/2008 |
| JP | 2005526207 A | 9/2005 |
| RU | 2529990 C1 | 10/2014 |

OTHER PUBLICATIONS

Danish Patent and Trademark Office, Search and Examination Report in PA 2015 70858, dated Aug. 15, 2016.
China National Intellectual Property Adminstration, First Notification of Office Action in CN Application No. 201680082289.3, dated Jul. 3, 2019.
Japanese Patent Office, Notice of Reasons of Refusal in JP Application No. 2018-533232, dated Dec. 22, 2020.

METHODS FOR MOUNTING OR DISMOUNTING WIND TURBINE COMPONENTS OF A MULTIROTOR WIND TURBINE

FIELD OF THE INVENTION

The present invention relates to a method of mounting or dismounting wind turbine components of energy generating units in a multirotor wind turbine. The multirotor wind turbine comprises a tower configured to support one or more load carrying structures arranged for supporting at least two energy generating units positioned at the ends of the load carrying structure and at opposite sides of the tower.

BACKGROUND OF THE INVENTION

Wind turbines normally comprise one or more energy generating units, each unit comprising a nacelle, a rotor with a number of wind turbine blades, and other wind turbine components such as a generator, gear arrangement, drive train, heat exchangers etc. The wind acts on the wind turbine blades, thereby causing the rotor to rotate. The rotational movements of the rotor are transferred to a generator, either via a gear arrangement or directly, in the case that the wind turbine is of a so-called direct drive type. In the generator, electrical energy is generated, which may be supplied to a power grid.

Some wind turbines are provided with two or more energy generating units in order to increase the total power produced by the wind turbine, without having to provide the wind turbine with one very large, and therefore heavy, rotor. Such wind turbines are sometimes referred to as 'multirotor wind turbines'.

In multirotor wind turbines the energy generating units may be carried by a load carrying structure which is, in turn, connected to a tower structure. Thereby at least some of the energy generating units are not mounted directly on the tower structure, and they may have a centre of gravity which is displaced with respect to a longitudinal axis defined by the tower structure. In general, the larger the rotor diameters, the further off the rotors are displaced with respect to the tower axis. When the wind acts on rotors mounted in this manner, thrust forces will be created, which will in turn cause loads to be introduced in the load carrying structure, and possibly at connection points between the load carrying structure and the tower structure.

In order to ensure the stability of a multirotor wind turbine, the energy generating units are arranged symmetrically around the tower axis, as the weight of the units would otherwise impose undesirable very large bending moments in the tower.

Likewise, such unbalance would cause undesirable and very large loads in the yaw arrangement for turning the rotors into the wind.

When erecting a wind turbine, it is normally necessary to use external crane equipment for erecting the tower and lifting the one or more nacelles, hubs, wind turbine blades, etc. to their position on the tower. As the size of wind turbines increases, the size of the crane necessary for performing such operations also increases. For multirotor wind turbines, the number of lifting operations is generally multiplied corresponding to the number of rotors. Furthermore, as the rotors are normally positioned on both sides of the tower axis, the nacelles and rotors are lifted from different ground positions necessitating two cranes or moving the crane around. This inevitably makes the erecting process more complicated and time consuming, increasing the cost correspondingly. The same problems arise when the multirotor needs servicing and repair or upgrade or renewal on some of the wind turbine components of the energy generating units.

It may be very difficult and expensive to rent this kind of crane equipment, and to transfer it to and from the operating site of the wind turbine. In some cases, the costs of renting the crane equipment may even exceed the costs of producing the wind turbine. It is therefore very desirable to reduce the need for crane equipment for erecting and dismantling wind turbines.

DESCRIPTION OF THE INVENTION

It is an object of embodiments of the invention to provide a method for erecting or at least partly dismantling a multirotor wind turbine in a cost effective yet effective manner.

According to a first aspect, the invention provides a method of mounting or dismounting wind turbine components of energy generating units in a multirotor wind turbine, the multirotor wind turbine comprising a tower configured to support one or more load carrying structures each extending between a first end and a second end, wherein each load carrying structure is arranged for supporting at least two energy generating units arranged at or near the first and second ends of the load carrying structure and at opposite sides of the tower, and wherein the load carrying structure is attached to the tower via a yaw arrangement allowing the load carrying structure to yaw around the tower, the method comprising:

positioning or dispositioning a first wind turbine component of a first energy generating unit at or near the first end of the load carrying structure;

yawing the load carrying structure approximately 180 degrees; and positioning or dispositioning a second wind turbine component of a second energy generating unit at or near the second end of the load carrying structure opposite the first end.

The method according to the first aspect of the invention is for mounting or dismounting wind turbine components of energy generating units in a multirotor wind turbine. I.e. for example mounting a component during erecting of the wind turbine or dismounting or replacing a component during repair or servicing. The mounting or dismounting includes positioning or dispositioning (i.e. removing completely or in part) the wind turbine components.

In the present context the term 'multirotor wind turbine' should be interpreted to mean a wind turbine comprising two or more rotors or energy generating units mounted on one tower structure. The load carrying structure is arranged for supporting two or more energy generating units, and for being connected to a tower of the multirotor wind turbine. Accordingly, the load carrying structure forms a connection between the two or more energy generating units and the tower structure, and is capable of handling the loads involved with carrying the energy generating units.

The energy generating units are arranged at or near the ends of the load carrying structure and at opposite sides of the tower in order to balance forces and loads with respect to the tower structure. The energy generating units may, e.g., be arranged at extremities of the load carrying arrangement, the extremities being arranged furthest away from the tower structure.

The load carrying structure is attached to the tower via a yaw arrangement whereby the load carrying structure is allowed to perform yawing movements with respect to the tower structure, thereby allowing the rotors of the energy generating units to be directed into the incoming wind.

In the present context the term 'energy generating unit' should be interpreted to mean a part of the wind turbine which actually transforms the energy of the wind into electrical energy. Each energy generating unit thereby typically comprises a rotor, carrying a set of wind turbine blades, and a generator. The energy generating unit may further comprise a gear arrangement interconnecting the rotor and the generator and a drive train. The generator, and possibly the gear arrangement, may be arranged inside a nacelle.

The wind turbine component of an energy generating unit may be any part of or the entire energy generating unit. The wind turbine component may for example be the nacelle with or without parts of or the entire rotor, a wind turbine blade, a generator, drive train, gear arrangement, heat exchangers, etc.

In the present context the term 'tower' or 'tower structure' should be interpreted to mean a substantially vertical structure, arranged to carry the energy generating units of the multirotor wind turbine, at least partly via one or more load carrying structures. It is not ruled out that one or more energy generating units are mounted directly on the tower structure. The tower may comprise a number of tower segments, which are assembled to form the tower structure. The tower segments may be assembled in a reversible manner, e.g. using screws or bolts, or in an irreversible manner, such as by means of welding or the like. As an alternative, the tower structure may be made from concrete, and may be reinforced by means of for example by fibers in the concrete material or by wires, e.g. arranged inside the tower structure.

It is not ruled out that a single tower structure may have two or more load carrying structures of the kind described above mounted thereon. In this case the load carrying structures may advantageously be arranged one above the other along the length of the tower structure.

According to the first aspect of the invention the method comprises positioning or dispositioning a first wind turbine component of a first energy generating unit at or near the first end of the load carrying structure. Hereafter the load carrying structure is yawed approximately 180 degrees, and then a second wind turbine component of a second energy generating unit is positioned or dispositioned at or near the second end of the load carrying structure opposite the first end.

The yawing of the load carrying structure approximately 180 degrees causes the second end of the load carrying structure to be rotated to approximately the position of the first end before the yawing.

Because of this yawing operation in between the positioning or dispositioning of the wind turbine components, the lifting, hoisting, or lowering operations are performed at the same place despite the wind turbines are positioned or dispositioned from opposite sides of the wind turbine tower and are arranged at relatively large distances apart. In some modern multirotor wind turbines the energy generating units may be placed in the order of 50-120 meters apart. By the method according to the invention, all the energy generating units and components thereof can be mounted or dismounted by the use of only a single barge, crane or hoisting arrangement and without having to move the barge, crane or hoisting arrangement around on the site in between the mounting or dismounting operations. Hereby the costs and the time consumption are reduced considerably.

Furthermore, the method according to the invention advantageously provides for the wind turbine components of the multirotor wind turbine to be mounted or dismounted alternatingly on the one and the other side of the tower. Hereby the unbalance of the multirotor wind turbine is reduced as compared to the situation of more wind turbine components being mounted or dismounted from the same side of the tower after each other. The yawing in between the mounting or dismounting operations thus allows for more easily positioning or dispositioning the energy generating units in multiple steps (such as first a nacelle, then a hub, thereafter one blade at a time, the generator etc.), each step involving mounting a wind component of lower weight than the entire energy generating unit. This aids in reducing the unbalance of the wind turbine structure caused by one more component being installed on the one side of the tower than on the other.

The method according to the invention may be applied on onshore wind turbines as well as on offshore wind turbines.

In an embodiment, the method comprises erecting the multirotor wind turbine and comprises erecting the tower and the load carrying structure prior to positioning the first wind turbine component. The multirotor wind turbine is especially prone to be unbalanced when being erected or dismantled where more energy generating units or parts of energy generating units may be positioned on one side of the tower than on the other for some time. Such unbalancing and the undesired loadings caused hereby are avoided or at least reduced by the proposed method according to the invention where the wind turbine components are positioned alternately on the first and on the second end of the load carrying structure and thereby alternately on each side of the tower.

The step of erecting the tower may comprise mounting a first tower segment on a foundation structure and subsequently mounting one or more further tower segments on the first tower segment, and the step of subsequently positioning the load carrying structure on the tower. A further tower segment may be mounted on top of the first tower segments to extend above the load carrying structure and may be arranged either before or after positioning the load carrying structure.

In an embodiment of the invention, the mounting or dismounting of the wind turbine components is part of servicing the multirotor wind turbine. The advantages hereof are the same as during erecting of the multirotor wind turbine as described above.

The multirotor wind turbine may comprise a second load carrying structure placed at a height on the tower different from the first load carrying structure.

In general, the tower may define a longitudinal axis, and the one or more load carrying structures may extend from the tower structure along a direction substantially perpendicularly to the longitudinal axis defined by the tower structure, i.e. the load carrying structure extends away from the tower structure along a substantially horizontal direction.

Alternatively, the load carrying structure may be angled or curved. i.e. extend away from the tower along directions which are not horizontal. For example, the load carrying structure may extend away from the tower in inclined upwards directions or in an inclined downwards directions.

According to an embodiment of the invention, the second load carrying structure is positioned at a lower position on the tower than the first load carrying structure, and the method comprises firstly yawing the lowermost second load carrying structures to a rotational position different from the uppermost first load carrying structure before the positioning or dispositioning of the wind turbine component at or near the end of the first load carrying structure. Hereby is ensured that the lowermost load carrying structure is yawed at least partly out of the way when securing the uppermost load carrying structure and positioning or dispositioning the wind turbine component at or near an end of the uppermost load carrying structure.

According to an embodiment of the invention, the mounting is part of erecting the multirotor wind turbine, and the first and second wind turbine components are nacelles, the method further comprises subsequently to having mounted the first and second nacelles:

attaching at least a part of a rotor on one of the first or second nacelle;
yawing the load carrying structure approximately 180 degrees; and
attaching at least a part of a second rotor at the other of the first or second nacelle.

Preferably, the rotor on the second nacelle is attached first before the rotor on the first nacelle, as the mounting of the second nacelle can then be followed by the hoisting and attachment of the rotor to the second nacelle without any yawing in between.

By mounting the nacelles first and then the rotors thereafter, the unbalance of the wind turbine structure in the time interval from the first wind turbine component is positioned and until the corresponding second wind turbine component is positioned at the opposite side, can be reduced considerably when compared to the situation of mounting each nacelle together with its rotor.

A further embodiment of the invention according to the above further comprises:

positioning a second load carrying structure at a different height than the first load carrying structure;
yawing the first load carrying structure to a rotational position different from the second load carrying structure;
positioning a third wind turbine component at or near a first end of the second load carrying structure;
yawing the second load carrying structure approximately 180 degrees; and
positioning a fourth wind turbine component at or near a second end of the load carrying structure opposite the first end.

Hereby the wind turbine components on an additional load carrying structure may likewise be mounted and positioned with the need of a barge, crane or other hoisting equipment on only one site position and without the need for a further barge, crane or hoisting arrangement to mount the wind turbine components at the other opposite side of the tower.

In a further embodiment of the invention, the positioning of the wind turbine component includes hoisting the wind turbine component into position and attaching the wind turbine component to the load carrying structure. The hoisting may be performed by means of a crane and/or by means of a cable attached to the load carrying structure. The hoisting may be performed in any conventional way and may as an example include a hoisting arrangement arranged in or mounted on the wind turbine, temporarily or permanently.

The step of attaching the wind turbine component to the load carrying structure may for example comprise attaching a nacelle of the energy generating units to the load carrying structure, attaching a rotor to a nacelle already mounted on the load carrying structure, mounting and attaching a rotor blade to the hub, and/or mounting some component like for example the generator or a gear arrangement etc. in a nacelle or on the hub etc.

In a further embodiment, the method further comprises securing the load carrying structure against up and down tilting movements before positioning or dispositioning of the wind turbine component. Here, the load carrying structure is first secured against up and down tilting movements and next, the wind turbine component is positioned or dispositioned.

By securing the load carrying structure when positioning or dispositioning the wind turbine component is advantageously achieved, that the unbalance created by the positioning or dispositioning of the wind turbine component from one side of the tower is reduced or prevented. Hereby the loadings on especially the tower and the yawing arrangement caused by such unbalance are correspondingly reduced or prevented. Thereby the requirements to the tower stiffness, strength and bending moment resistance may be reduced considerably.

An energy generating unit of a modern wind turbine may weigh in the magnitude of several tons (such as in the order of 30-150 tons for a nacelle with a rotor) and be placed at a distance in the order of 20-70 meters from the tower. By the method of mounting or dismounting a wind turbine component according to the invention considerable bending moments and loadings in the tower and in the yawing arrangement are avoided.

Hereby the tower dimensions may be reduced, which reduces primarily the material costs but also the manufacturing and transportation costs of the tower. Likewise, the yawing arrangement can be manufactured to withstand less extreme loadings and thereby at reduced costs.

The securing of the load carrying structure may be performed prior to or at least simultaneously to the positioning or dispositioning of the wind turbine component. The securing comprises preventing or at least in part reducing or restricting the up and down tilting movements of the load carrying structure. By up and down tilting movements are here understood movements of the load carrying structure from the movement of the end of the load carrying structure at least in a vertical plane. If not prevented or restricted, such movements arise from the unbalance caused by the positioning or dispositioning of the wind turbine component where the weight of the wind turbine component is added or removed from one end of the load carrying structure and thereby from one side of the tower.

The securing of the load carrying structure may be maintained completely or in part while positioning the dispositioning of the component. Additionally, the securing may be maintained or upheld after the positioning or dispositioning of the component has been performed for example until the balance can be partly or completely re-established. The securing may for example be maintained or upheld until the wind turbine component is replaced or until another wind turbine component of comparable weight is positioned or dispositioned at the opposite side of the wind turbine tower.

The way the load carrying structure is secured may be kept constant or may be changed during the positioning or dispositioning of the wind turbine component. For example can the weight of a counterweight be changed or adjusted, such as gradually increased or decreased to avoid any abrupt changes, and/or increased or decreased in steps corresponding to a wind turbine component being positioned or dispositioned in steps.

The securing against up and down tilting movements may be performed in different ways as discussed in more detail in the following.

According to an embodiment, the securing of the load carrying structure comprises attaching a counterweight near an end of the load carrying structure. The counterweight is attached at or near the second end if positioning the wind turbine component at the first end, and is attached at or near the first end if dispositioning the wind turbine component at or near the first end. Hereby the weight of the wind turbine component is completely or in part out-balanced by the counterweight, thereby countering the weight and the load moment from the added or removed wind turbine component. The unbalance may hereby be reduced or completely avoided by simple, yet effective and in-expensive means. Further, the counterweight can be established even with restricted space available due to for example vegetation, uneven ground etc. The weight of the counterweight may be chosen to be in the range of 25-125% of the weight of the wind turbine component, such as in the range of 40-100%, such as in the range of 50-75%. Hereby, a considerable reduction of the unbalance otherwise caused by the positioning or dispositioning of the wind turbine component is achieved without the need to know or establish the precise same weight. Further, by the use of a counterweight with a smaller weight than the wind turbine component is obtained that the attaching of the counterweight in itself does not create an undesirable unbalance of the multirotor wind turbine.

The counterweight is relatively simple and fast to attach and can be correspondingly simply removed again when no longer needed. The counterweight may be kept attached to the load carrying structure during the yawing. Hereby, the counterweight can act to balance the multirotor wind turbine up until the balance is re-established by the positioning or dispositioning of the second wind turbine component.

The counterweight may be attached to the load carrying structure for example by means of cables or ropes. The counterweight may be positioned at a height just above or near the ground hanging from the load carrying structure. Hereby the counterweight need only be lifted a small amount. Alternatively, the counterweight may be positioned at a height just below or relatively close to the load carrying structure. Thereby any potential oscillations of the hanging counterweight are kept minimal.

In an embodiment, the counterweight comprises an adjustable mass. This allows for changing or adjusting the mass to improve the balancing of the multirotor wind turbine and to better match the weight of the counterweight to the weight of the wind turbine component.

In one embodiment, the attaching of the counterweight comprises pumping a liquid into a ballast tank attached near the end of the load carrying structure. Hereby the weight of the counterweight may be continuously or discontinuously adjusted both up and down as desired. This further provides for a method for relatively simply adjusting the weight of the counterweight regardless of the height the counterweight is positioned in and by simple means. The liquid, such as water, may for example be pumped up into or pumped out of a ballast tank from a tank truck.

According to a further embodiment of the invention, the securing of the load carrying structure comprises attaching a balloon near an end of the load carrying structure. The balloon is attached at the same end as the wind turbine component if positioning the wind turbine component and is attached at the opposite end if dispositioning the wind turbine component. The balloon is thus attached to the same end of the load carrying structure as the wind turbine component when the component is positioned thereby countering at least in part or completely the weight hereof. The balloon may be attached directly above the wind turbine component or at a different distance to the tower. The balloon may comprise a gas such as Helium or propane. The use of a balloon yields the same advantages as the use of a counterweight as described in the above and of for example the possibility to adjust the lifting force.

According to a further embodiment of the invention, the securing of the load carrying structure comprises attaching a compression bar between an end of the load carrying structure and a lower part of the tower. The compression bar is attached such as to take up the compression forces. The compression bar hereby acts to effectively carry at least a part of the weight from the wind turbine component. The compression bar could, e.g., be in the form of a tube, a rod, a beam, such as an I-beam, etc.

The compression bar may be attached by bolts or the like fastening means and may thereby be easily removed again when no longer needed. The compression bar may be attached to and rest against the tower via a ring placed around or fastened to the tower.

BRIEF DESCRIPTION OF THE DRAWINGS

The invention will now be described in further detail with reference to the accompanying drawings in which.

DETAILED DESCRIPTION OF THE DRAWINGS

Figure 1:
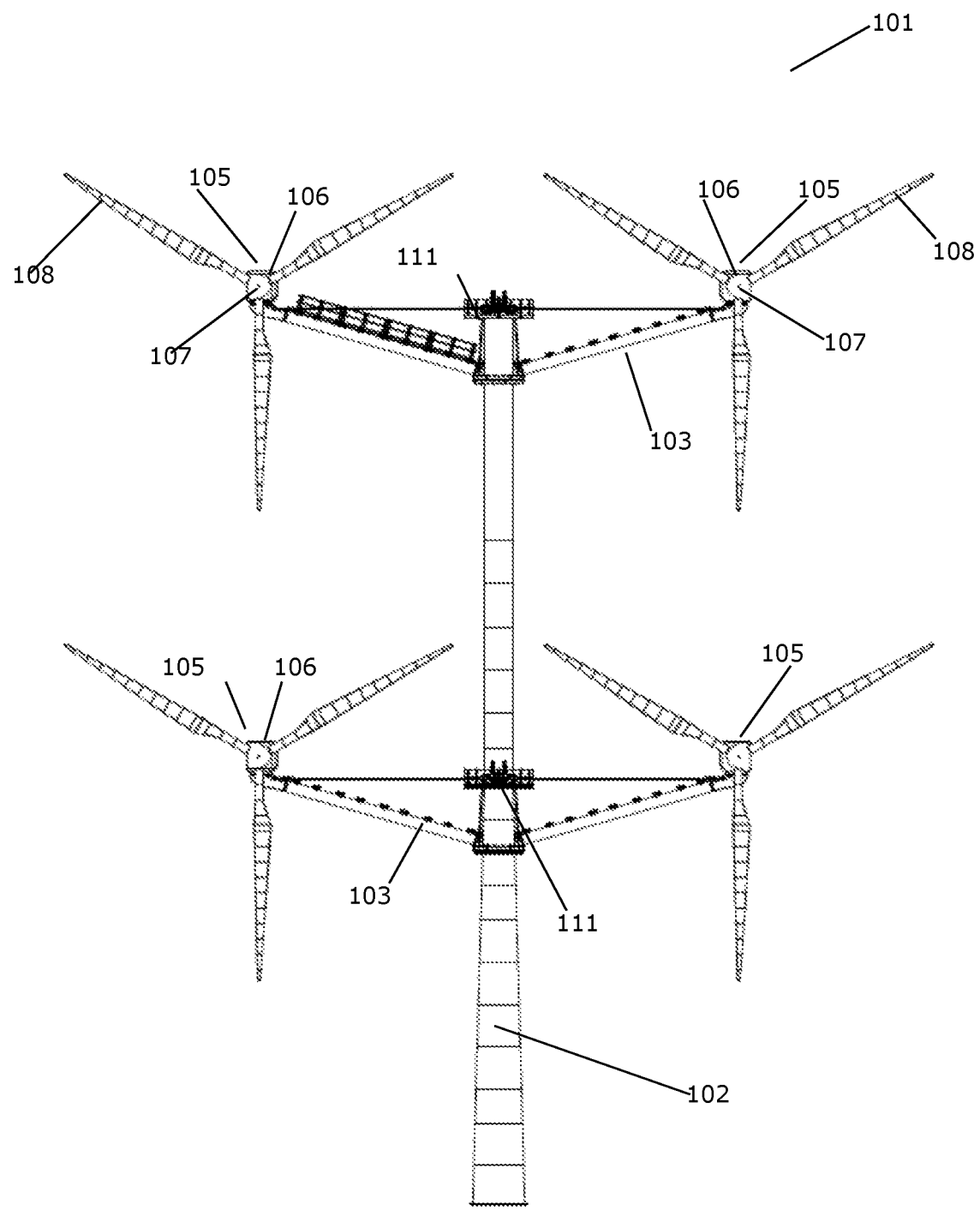
FIG. 1 is a front view of a multirotor wind turbine comprising two load carrying structures according to an embodiment of the invention.

FIG. 1 is a front view of a multirotor wind turbine 101 comprising a tower structure 102 carrying two load carrying structures 103 according to an embodiment of the invention. The load carrying structures 103 are arranged, one above the other, along the length of the tower structure 102.

Each load carrying structure 103 extending between a first end and a second end on opposite sides of the tower structure 102, as seen from the viewing angle of FIG. 1. Each load carrying structure 103 supports at least two energy generating units 105, each energy generating unit 105 comprising a nacelle 106 and a rotor 107 carrying three wind turbine blades 108.

The load carrying structures 103 are attached to the tower structure 102 via a yaw arrangement 111, allowing the entire load carrying structure 103 to perform yawing movements with respect to the tower structure 102 in order to direct the rotors 107 into the incoming wind.

When the multirotor wind turbine 101 is operational, the energy generating units 105 are placed symmetrically around the tower 102 so that the multirotor wind turbine 101 is balanced.

The method according to the invention relates to the mounting or dismounting of a wind turbine component of an energy generating unit in a way to reduce or avoid the unbalance of the multirotor wind turbine that such mounting or dismounting may otherwise cause. The wind turbine component may be an energy generating unit or any part or parts hereof such as a nacelle, a rotor, a wind turbine blade, a hub, a generator, a drive train, or a gear arrangement.

Figure 2:
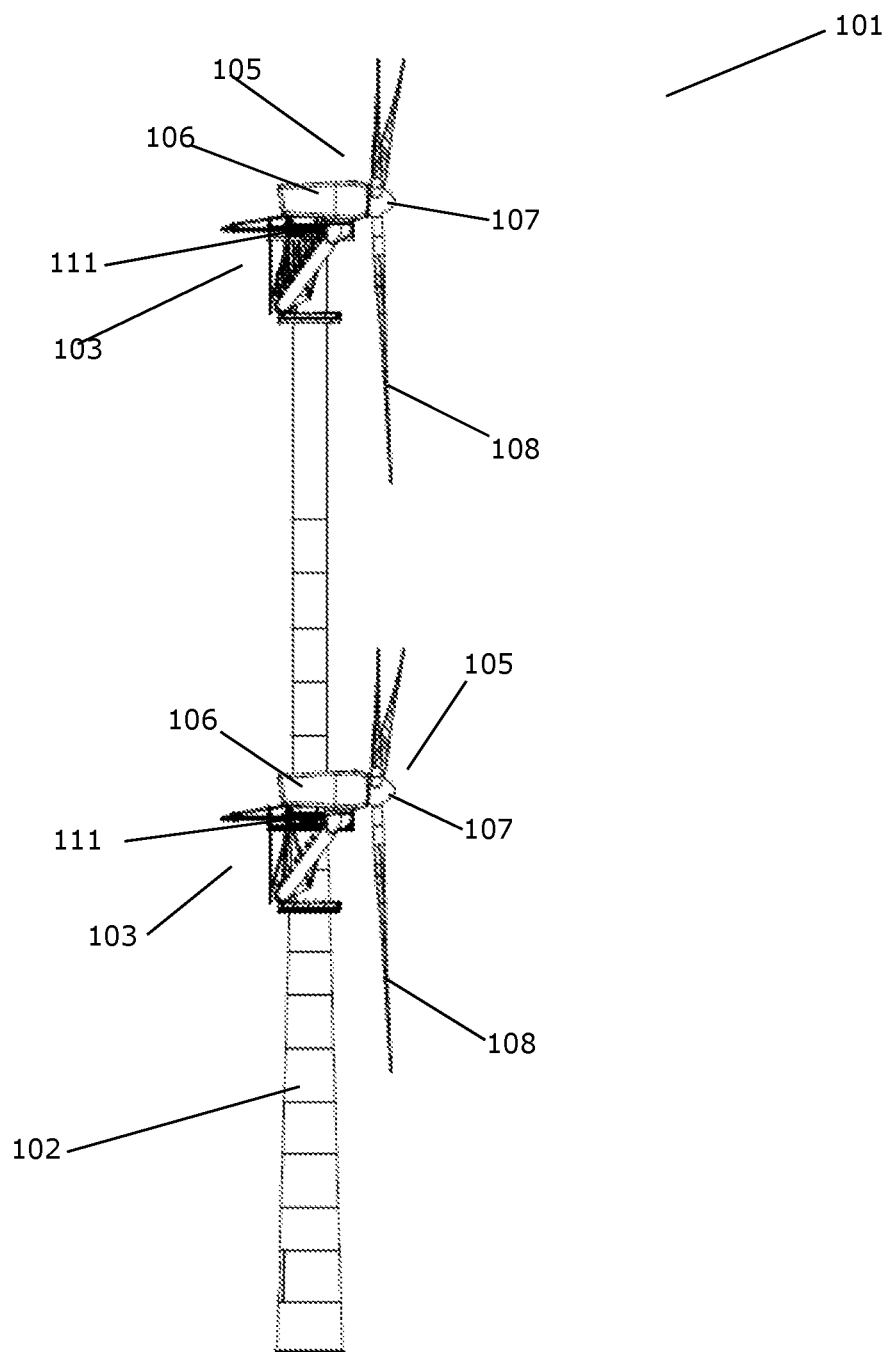
FIG. 2 is a side view of the multirotor wind turbine of FIG. 1, FIGS. 3A-L and 4A-D illustrate a method for erecting a multirotor wind turbine including the mounting of wind turbine components according to an embodiment of the invention.

FIG. 2 is a side view of the multirotor wind turbine 101 of FIG. 1. It can be seen in FIG. 2 that the load carrying structures 103 in this embodiment extend from a position behind the tower structure 102 to a position in front of the tower structure 102, thereby positioning the rotors 107 of the energy generating units 105 in front of the tower structure 102, and facing the incoming wind.

Figure 3A:
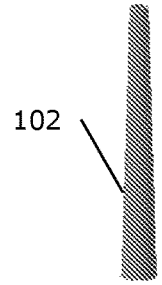
Figure 3B:
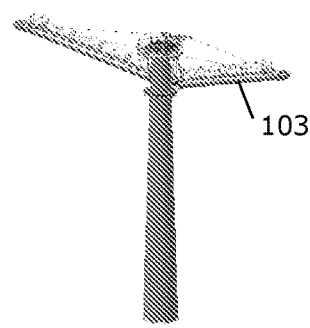
Figure 3C:
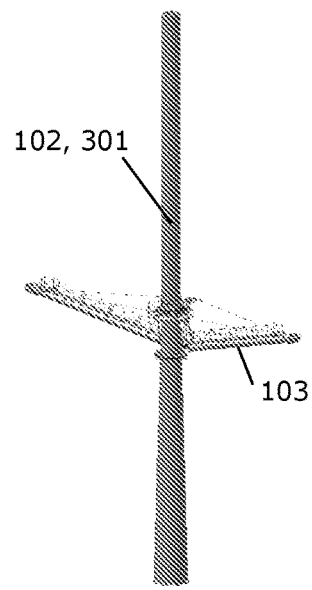
Figures 3D, 3E:
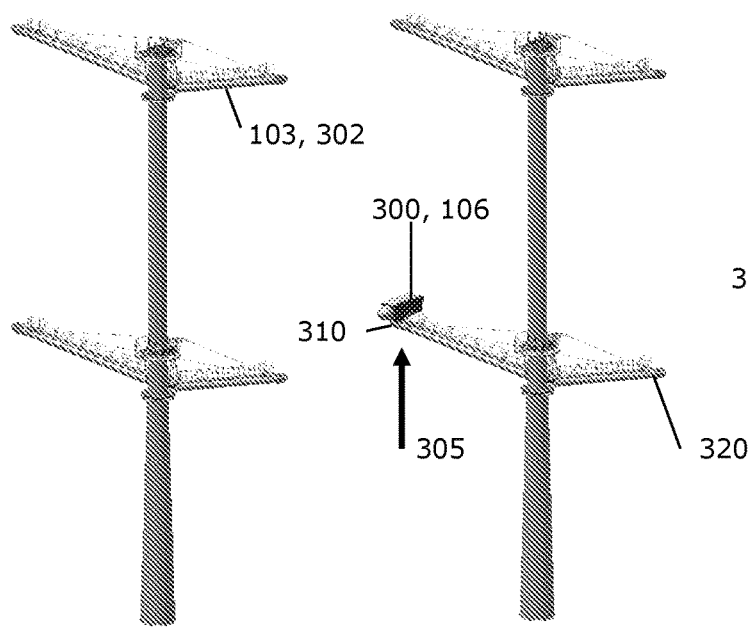
Figure 3F:
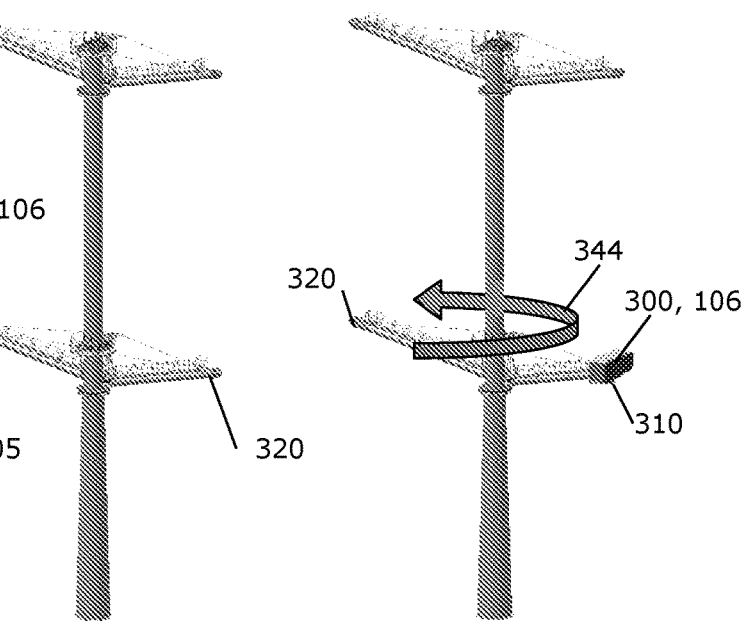

FIGS. 3A-L illustrate a method for erecting a multirotor wind turbine including the mounting of a wind turbine component according to an embodiment of the invention. Here the tower 102 comprises at least two tower segments 301. The first tower segment 301 is positioned on the foundation (FIG. 3A) and a first load carrying structure 103 is attached to the tower (FIG. 3B). Then a further tower segment 301 is mounted on top of the first tower segment (FIG. 3C) which in this embodiment is performed such that the load carrying structure 103 may be yawed around the tower 102 without any part of the tower 102 being yawed. In other words, the yawing arrangement 111 is here arranged to surround the tower 102. FIG. 3D illustrates the attachment of a second load carrying structure 302 at a greater height than the first load carrying height. Then a wind turbine component 300 which here is a nacelle 106 is arranged at or near a first end 310 of the load carrying structure 103 (FIG. 3E) as indicated by arrow 305.

Then the load carrying structure 103 is yawed approximately 180 degrees, as illustrated by arrow 344 (FIG. 3F), and a further nacelle 106 is arranged at or near the second opposite end 320 of the load carrying structure 103 (FIG. 3G) and as indicated by arrow 305. The nacelles 106 may be hoisted into position by means of a crane or cable winches or the like.

Figures 3G, 3H, 3I:
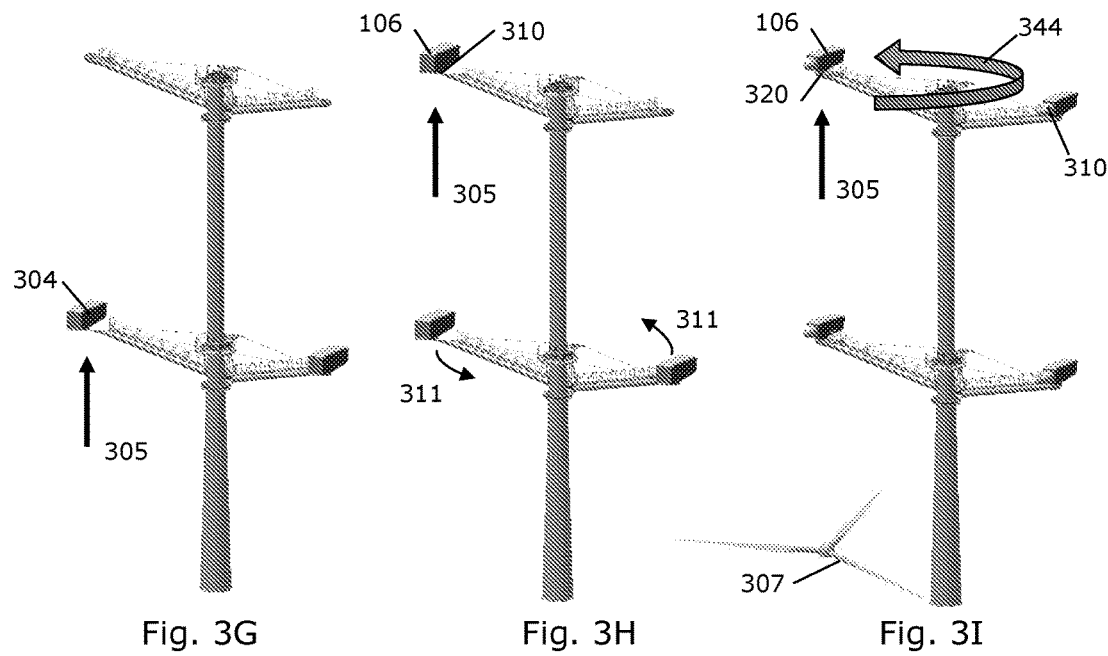

Then the nacelles 106 on the second load carrying structure 302 are to be mounted. Before mounting any wind turbine component on the second uppermost load carrying structure 302, the lower load carrying structure 103 is yawed relative to the uppermost load carrying structure 302 (as indicated by the arrows 311) such that the load carrying structures are positioned at different rotational positions (FIG. 3H). In this way the lowermost load carrying structure is out the way for the mounting operations performed on the uppermost load carrying structure.

Then a nacelle 106 is hoisted 305 and attached to the first end 310 of the upper load carrying structure (FIG. 3H), the load carrying structure 302 is yawed approximately 180 degrees as indicated by arrow 344 in FIG. 3I, and the fourth nacelle 106 is hoisted into position at or near the second end 320 of the load carrying structure.

Figures 3J, 3K, 3L:
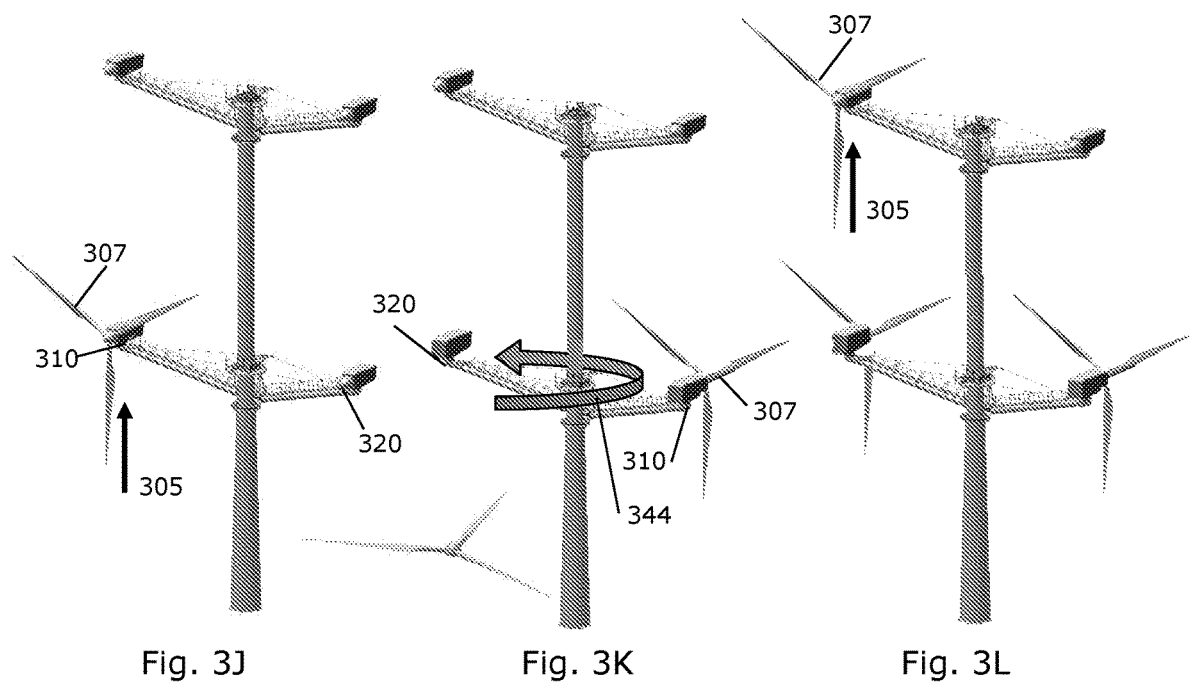
Figure 4A:
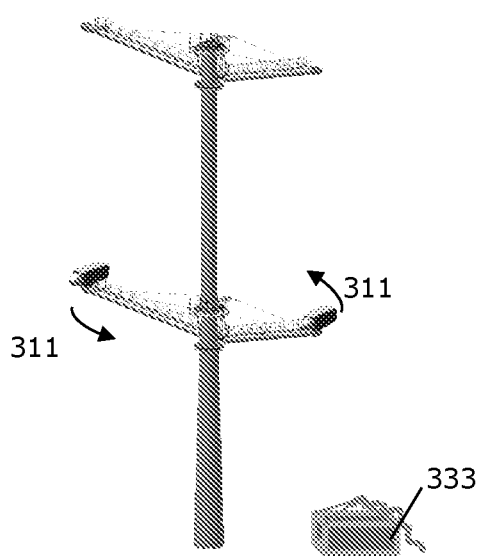
Figure 4B:
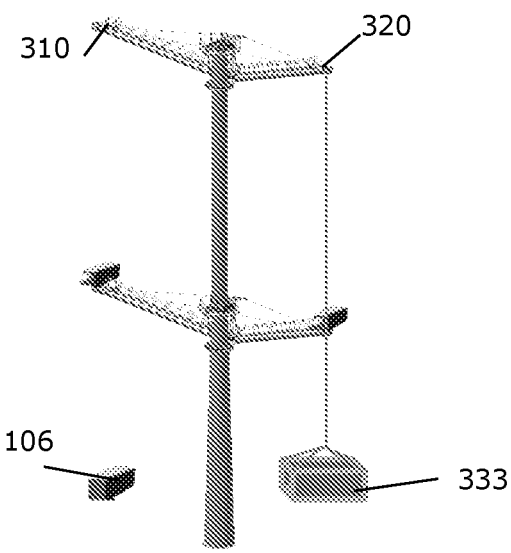
Figure 4C:
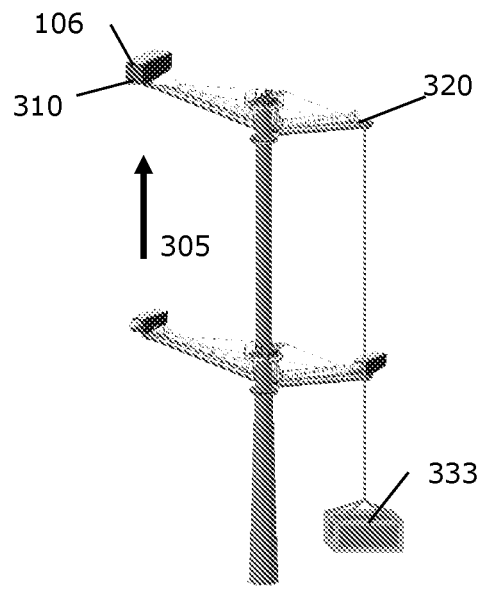
Figure 4D:
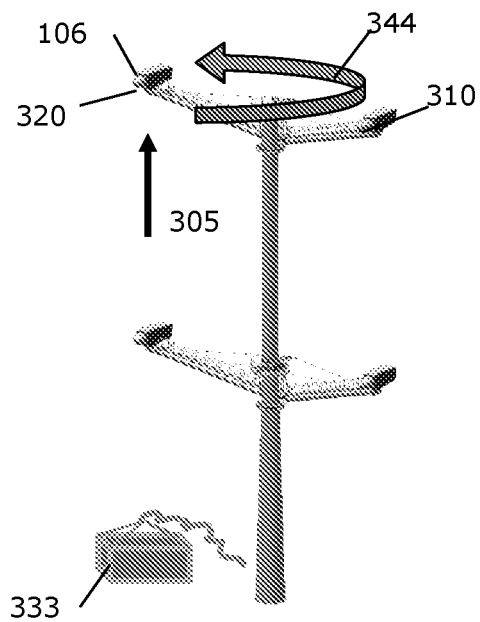

FIGS. 3J-3L illustrate the mounting and positioning of the rotors 307 of the multirotor wind turbine 101 applying the same method of yawing 344 the load carrying structure 103 in between the mounting of the wind turbine component (here the rotor 307) at opposite end of the load carrying structure 103.

It is noted from FIGS. 3A-L, that all the hoisting operations are performed at the same side of the wind turbine 101.

By mounting the lowermost nacelles first is obtained a better stability of the overall structure when later mounting the uppermost nacelles. However, the wind turbine components (including the nacelles) placed at the highest positions may alternatively be positioned before the wind turbine components at the lower positions.

FIGS. 4A-4D illustrate how a counterweight 333 can be attached to the second end 320 of the load carrying structure 103 before positioning a nacelle 106 at the first end 310 of the load carrying structure. The counterweight 333 acts to secure the load carrying structure 103 against up and down tilting movements thereby reducing the unbalance on the multirotor wind turbine 101 and reducing considerably the loadings induced primarily in the tower 102 and the yawing arrangement 111 by the unbalance. The counterweight 333 may for example have a weight of around 50% of the wind turbine component to be positioned thereby approximately halving the unbalance during the mounting operations. Here, the counterweight 333 is first attached to the second end 320, then the nacelle 106 is hoisted 305 into position and attached to the first end 310 (FIGS. 4A-4C) after which the counterweight 333 can be detached. In an embodiment, the counterweight 333 is kept attached during the yawing 344 of the load carrying structure 103 (FIG. 4D), and is then detached preferably at least partly at the same time as mounting the further nacelle 106 at the second end 320.

The rotors for each nacelle and any other still missing wind turbine components may be mounted in the same way as shown and described for the nacelles.

Although not shown in FIGS. 3 and 4, a counterweight may likewise be used when mounting and positioning the first two nacelles at the first lowermost load carrying structure.

Figure 5:
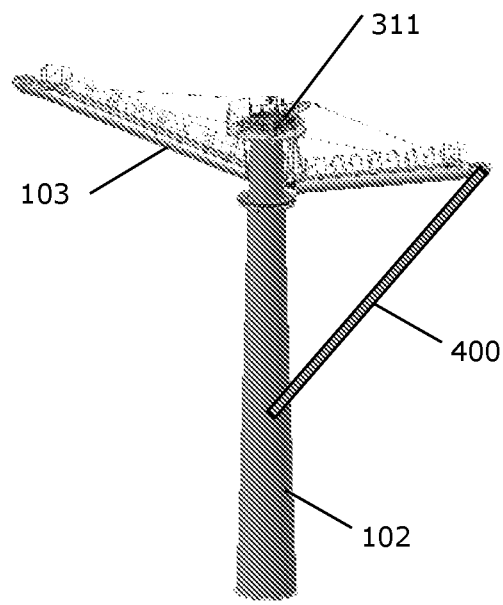
FIGS. 5 and 6 illustrate different methods of securing the load carrying structure against up and down tilting movements in accordance with embodiments of the invention.
Figure 6:
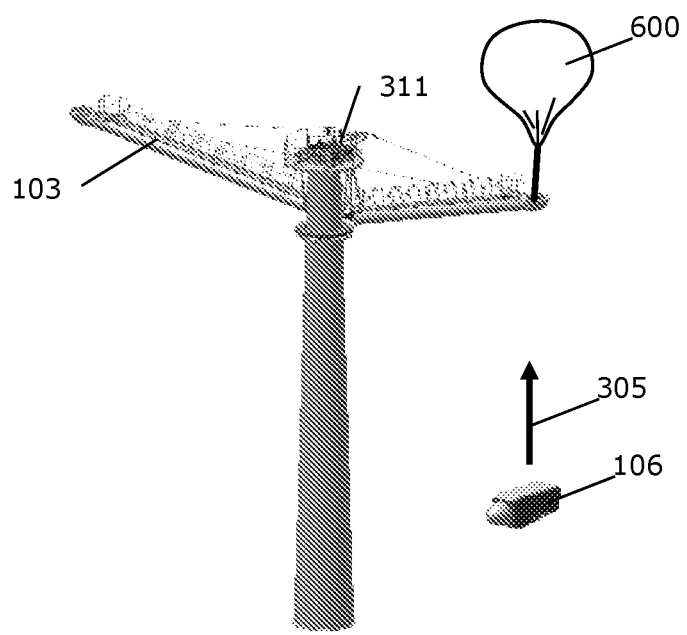

FIGS. 5 and 6 illustrate other alternative or additional methods of securing the load carrying structure against up and down tilting movements during positioning or dispositioning of a wind turbine component.

In FIG. 5 the load carrying structure 103 is supported at one end by a compression bar 400. The compression bar 400 may be positioned as shown in FIG. 5 between the load carrying structure 103 and the tower 102, thereby transferring the weight from the wind turbine component down to the lower part of the tower 102 via the compression bar 400 rather than through the bearings in the yawing arrangement 111 and the upper part of the tower 102. When hoisting a nacelle up into a wind turbine thereby creating an unbalance, the compression bar 400 should be positioned to carry at least part of the weight at the same end as the hoisting is performed. If e.g. a nacelle is dismounted from a turbine otherwise in balance, the compression bar 400 is to be placed at the opposite end as the dispositioned nacelle thereby at least partly carrying the weight of the remaining nacelle. The compression bar 400 may be fastened to the tower 102 in a ring structure (not shown) placed around the tower 102. Hereby yawing 344 of the load carrying structure 103 may be performed with the compression bar 400 kept in place.

In FIG. 6 is illustrated the use of a balloon 600 to at least partly secure the load carrying structure 103 against up and down tilting movements from the positioning of the wind turbine component such as the nacelle 106. The balloon 600 may be attached to the end of the load carrying structure 103 by ropes and the lifting force of the balloon 600 may be regulated and adjusted during the mounting or dismounting operations as desired. As with the compression bar 400 in FIG. 5, the yawing 344 of the load carrying structure 103 in between the hoisting operations may be performed with the balloon 600 kept in place.

The invention claimed is:

1. A method of mounting or dismounting wind turbine components of energy generating units in a multirotor wind turbine, the multirotor wind turbine comprising a tower configured to support one or more load carrying structures each extending between a first end and a second end, wherein each load carrying structure is arranged for supporting at least two energy generating units arranged at or near the first and second ends of the load carrying structure and at opposite sides of the tower, and wherein the load carrying structure is attached to the tower via a yaw arrangement allowing the load carrying structure to yaw around the tower, the method comprising:

positioning or dispositioning a wind turbine component of a first energy generating unit at or near the first end of the load carrying structure;

yawing the load carrying structure through 180 degrees a first time;

positioning or dispositioning a wind turbine component of a second energy generating unit at or near the second end of the load carrying structure opposite the first end;

yawing the load carrying structure through 180 degrees a second time;

positioning or dispositioning another wind turbine component of the first energy generating unit at or near the first end of the load carrying structure, wherein through multiple yawing of the load carrying structure the wind turbine components are positioned or dispositioned alternating on opposite sides of the tower to position or disposition the energy generating unit in multiple steps.

2. The method according to claim 1, wherein the mounting is part of erecting the multirotor wind turbine and the method further comprises positioning the tower and the load carrying structure prior to positioning the first wind turbine component.

3. The method according to claim 1, wherein the mounting or dismounting is part of servicing the multirotor wind turbine.

4. The method according to claim 1, wherein the wind turbine component comprises at least one in the group of a nacelle, a rotor, a wind turbine blade, a hub, a generator, a drive train, or a gear arrangement.

5. The method according to claim 1, wherein the multirotor comprises at least a second load carrying structure at a lower position on the tower than the first load carrying structures, and wherein the lowermost second load carrying structure is firstly yawed to a rotational position different from the uppermost first load carrying structure before the positioning or dispositioning of the wind turbine component at or near the end of the first load carrying structure.

6. The method according to claim 2, wherein the first and second wind turbine components are first and second nacelles, the method further comprising:

attaching at least a part of a rotor on one of the first or second nacelles;

yawing the load carrying structure through 180 degrees; and attaching at least a part of a second rotor at the other of the first or second nacelle.

7. The method according to claim 5 further comprising positioning a second load carrying structure at a different height than the first load carrying structure;

yawing the first load carrying structure to a rotational position different from the second load carrying structure;

positioning a third wind turbine component at or near a first end of the second load carrying structure;

yawing the second load carrying structure through 180 degrees; and positioning a fourth wind turbine component at or near a second end of the second load carrying structure opposite the first end.

8. The method according to claim 1, wherein the positioning of the wind turbine component or the another wind turbine component includes hoisting the wind turbine component or the another wind turbine component into position and attaching the wind turbine component to the load carrying structure.

9. The method according to claim 8, wherein the hoisting is performed by means of a crane and/or by means of a cable attached to the load carrying structure.

10. The method according to claim 1, further comprising securing the load carrying structure against up and down tilting movements before the positioning or dispositioning of the wind turbine component or the another wind turbine component.

11. The method according to claim 10, wherein the securing of the load carrying structure comprises attaching a counterweight near the first or second end of the load carrying structure.

12. The method according to claim 11, wherein the counterweight comprises an adjustable mass.

13. The method according to claim 11, wherein the attaching of the counterweight comprises pumping a liquid into a ballast tank attached near the first or second end of the load carrying structure.

14. The method according to claim 10, wherein the securing of the load carrying structure comprises attaching a balloon near the first or second end of the load carrying structure.

15. The method according to claim 10, wherein the securing of the load carrying structure comprises attaching a compression bar between the first or second end of the load carrying structure and a lower part of the tower during positioning or dispositioning of the wind turbine component.

16. The method according to claim 1, further comprising:

positioning or dispositioning another wind turbine component of the second energy generating unit at or near the second end of the load carrying structure prior to yawing the load carrying structure the second time.

* * * * *

UNITED STATES PATENT AND TRADEMARK OFFICE
CERTIFICATE OF CORRECTION

PATENT NO.       : 10,934,999 B2
APPLICATION NO.  : 16/061169
DATED            : March 2, 2021
INVENTOR(S)      : Torben Ladegaard Baun Page 1 of 1

It is certified that error appears in the above-identified patent and that said Letters Patent is hereby corrected as shown below:

In the Claims

Column 12, Claim 7, Line 3, change ""5" to --6--.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*